(12) United States Patent
Boord

(10) Patent No.: US 8,176,670 B2
(45) Date of Patent: May 15, 2012

(54) FIREARM STEADY-REST

(76) Inventor: Richard Nils Boord, Smithton, PA (US)

( * ) Notice: Subject to any disclaimer, the term of this patent is extended or adjusted under 35 U.S.C. 154(b) by 307 days.

(21) Appl. No.: 12/319,975

(22) Filed: Jan. 14, 2009

(65) Prior Publication Data

US 2009/0249674 A1    Oct. 8, 2009

Related U.S. Application Data

(63) Continuation-in-part of application No. 11/903,872, filed on Sep. 25, 2007, now Pat. No. 8,024,883.

(60) Provisional application No. 61/062,138, filed on Jan. 24, 2008.

(51) Int. Cl.
*F41C 27/00* (2006.01)

(52) U.S. Cl. .............................. 42/94; 73/167; 248/163.1

(58) Field of Classification Search ........................ 42/94
See application file for complete search history.

(56) References Cited

U.S. PATENT DOCUMENTS

| | | | | |
|---|---|---|---|---|
| 4,967,497 A * | 11/1990 | Yakscoe | | 42/94 |
| 5,345,706 A | 9/1994 | Brown | | |
| 5,913,668 A * | 6/1999 | Messer | | 42/94 |
| 6,629,380 B2 * | 10/2003 | Yeargin | | 42/94 |
| 6,920,713 B1 * | 7/2005 | Love | | 42/94 |
| 2007/0094911 A1 | 5/2007 | Rush et al. | | |
| 2007/0261287 A1 * | 11/2007 | Hunt et al. | | 42/94 |
| 2008/0047188 A1 * | 2/2008 | Lindstrom | | 42/94 |
| 2008/0086928 A1 * | 4/2008 | Pereksta | | 42/94 |

* cited by examiner

*Primary Examiner* — Michael Carone
*Assistant Examiner* — Samir Abdosh
(74) *Attorney, Agent, or Firm* — Carothers and Carothers

(57) ABSTRACT

A firearm steady-rest which is provided in a folded storage form which is incorporated as part of a rifle sling. The steady-rest may be deployed by folding it outward to provide either a V-shaped support configuration or a U-shaped support configuration whereby the upwardly extending distal ends of the support engage and support the firearm therebetween. The steady-rest may then be grasped by the operator's forward extending hand to provide maximum steadying of the firearm for sighting and shooting. A gravity deploying bi-pod leg set is also provided which automatically locks into position when fully deployed by a gravity slide lock.

13 Claims, 8 Drawing Sheets

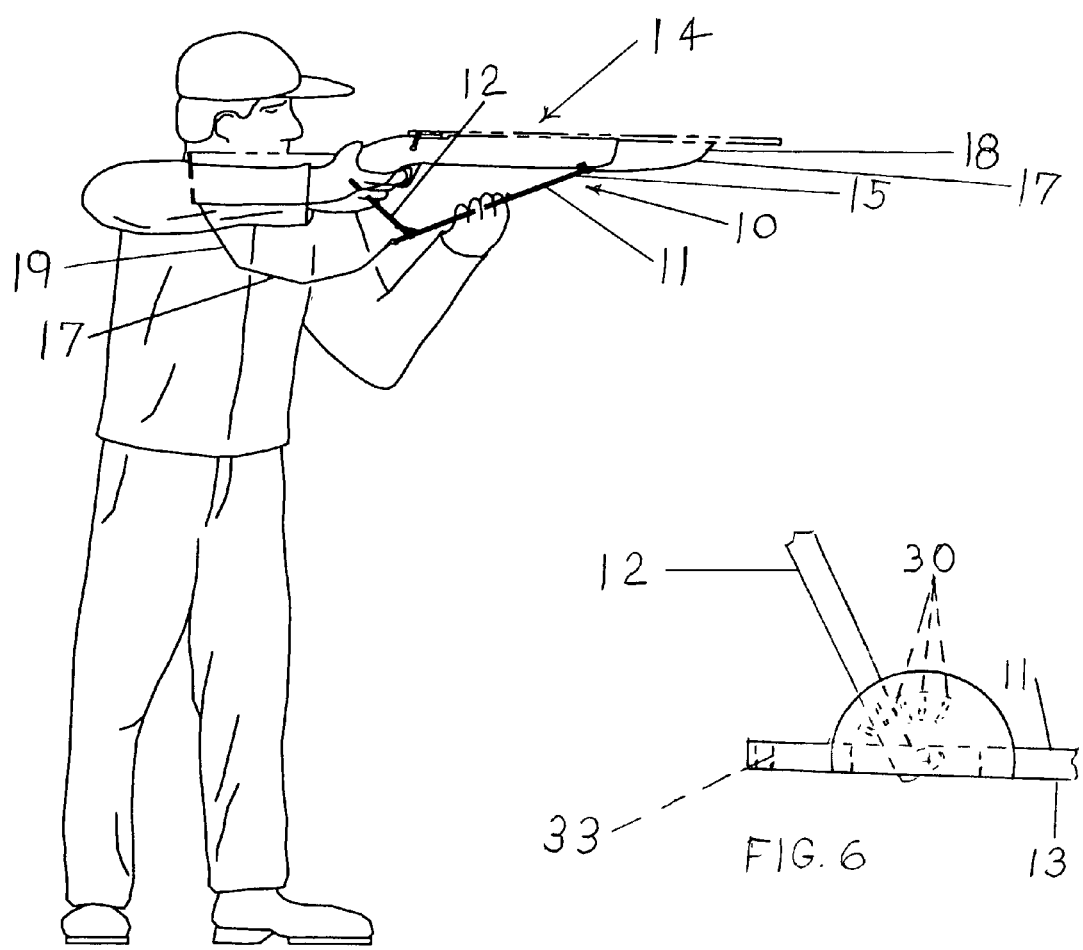
FIG. 5
FIG. 6
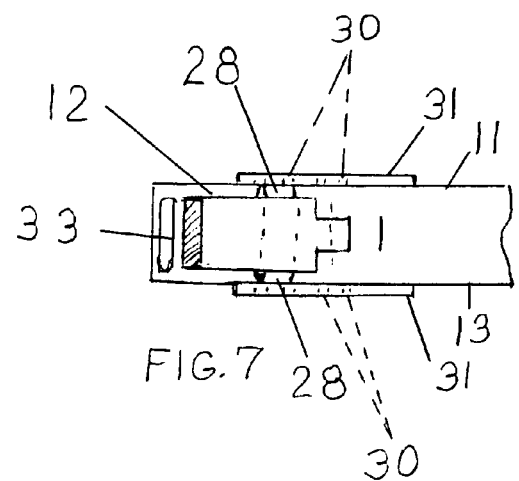
FIG. 7

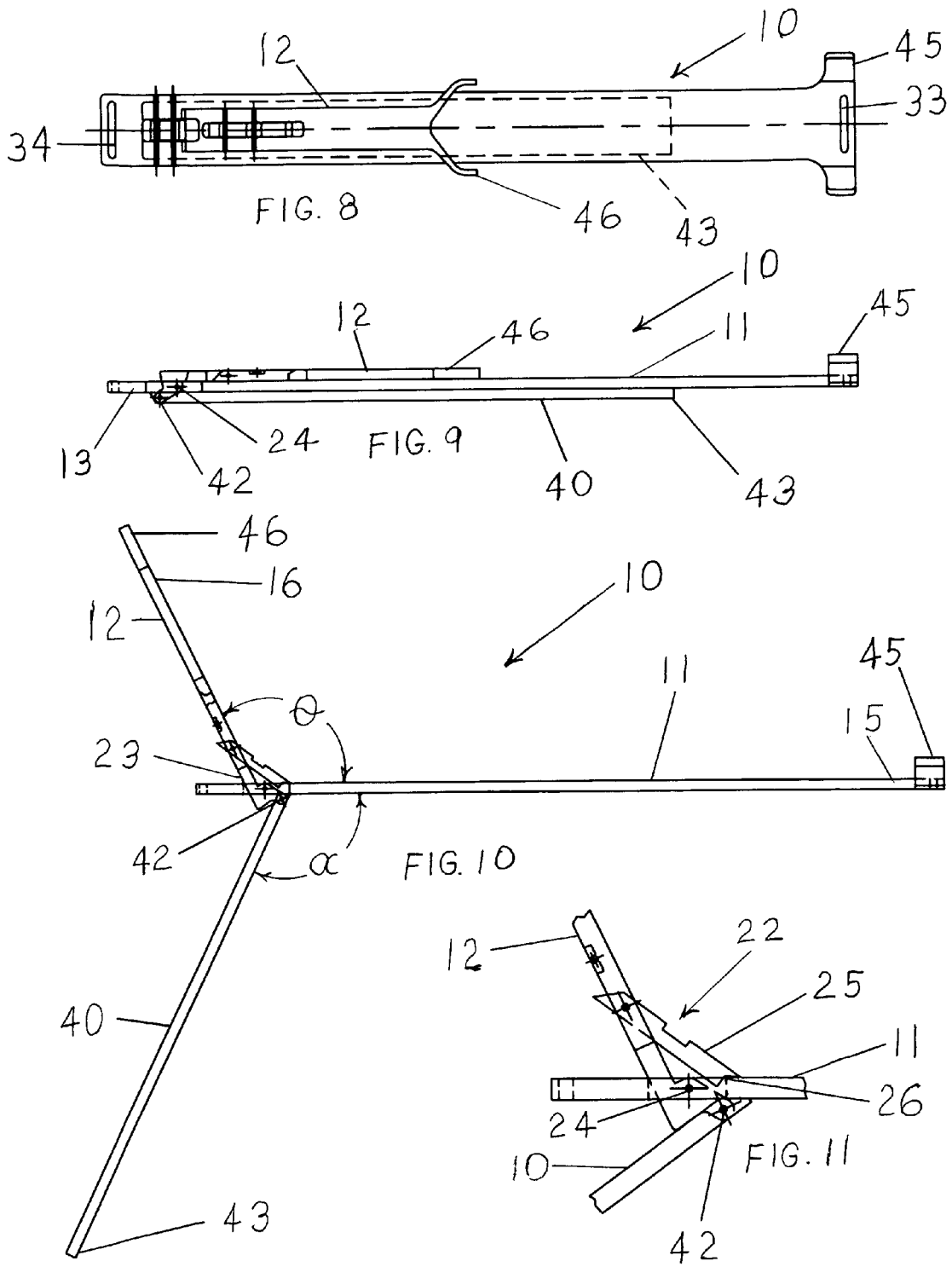

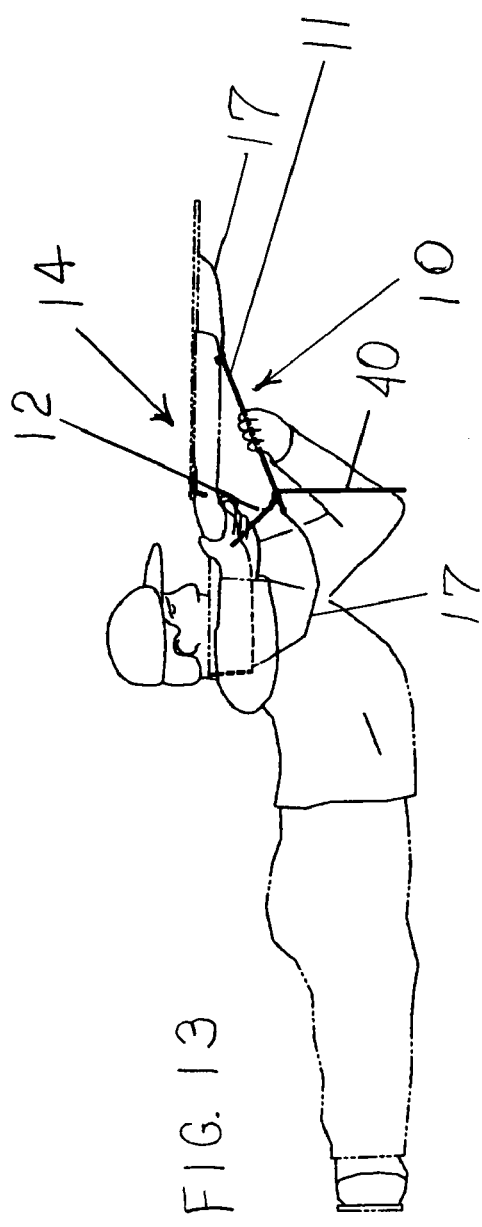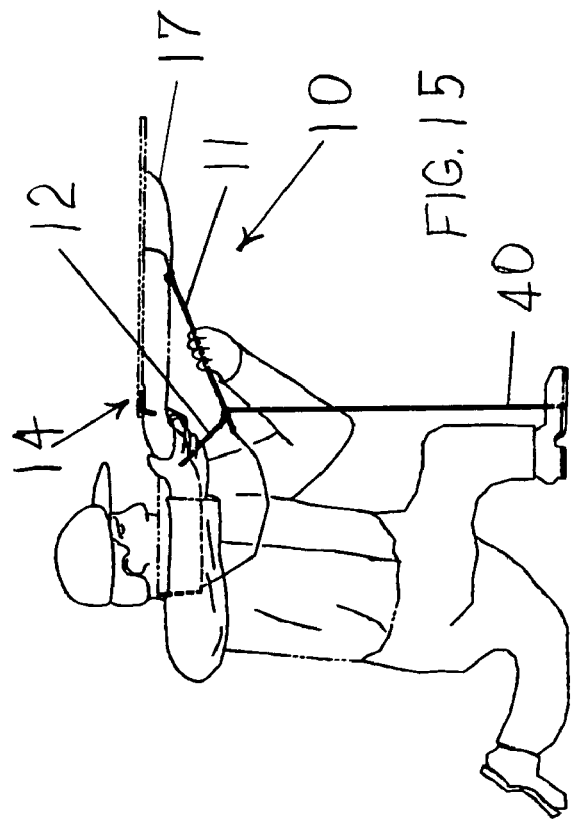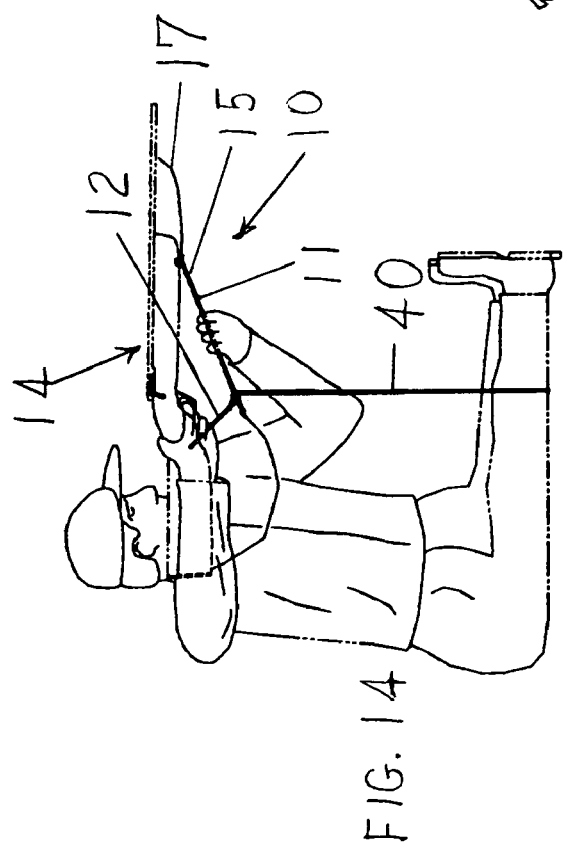

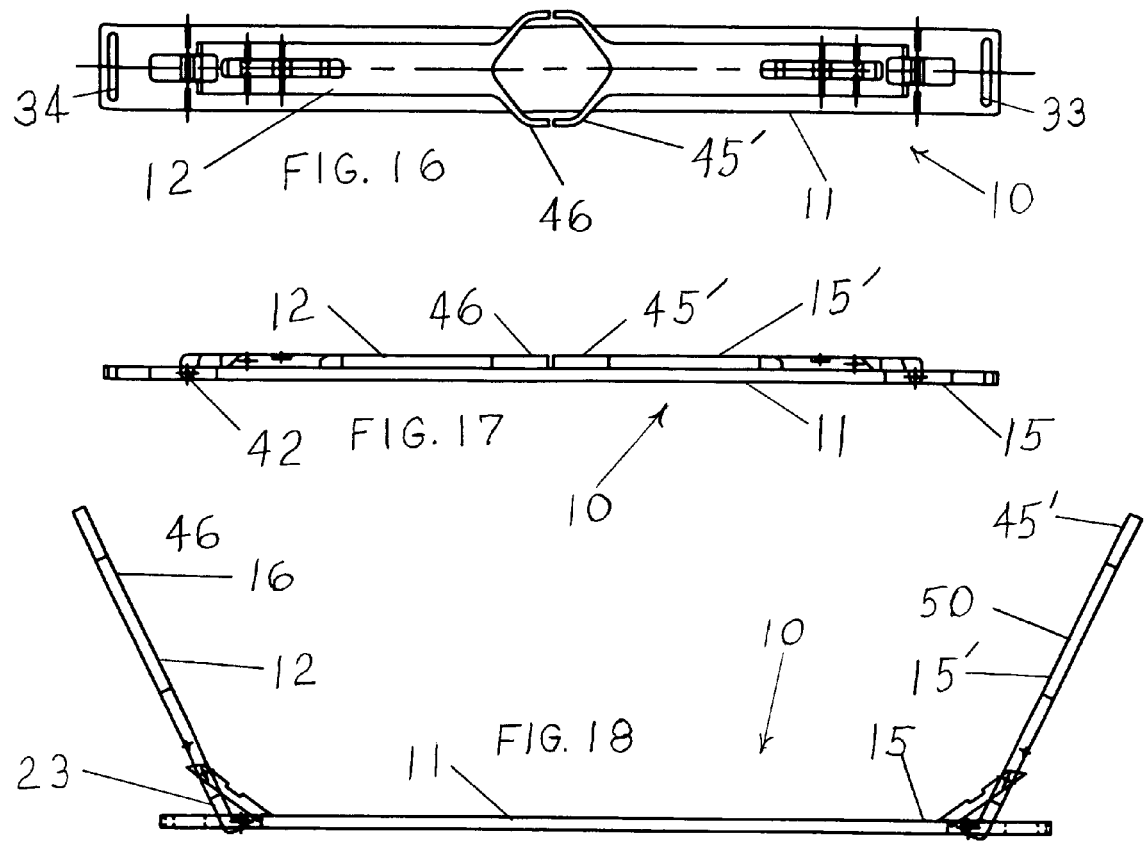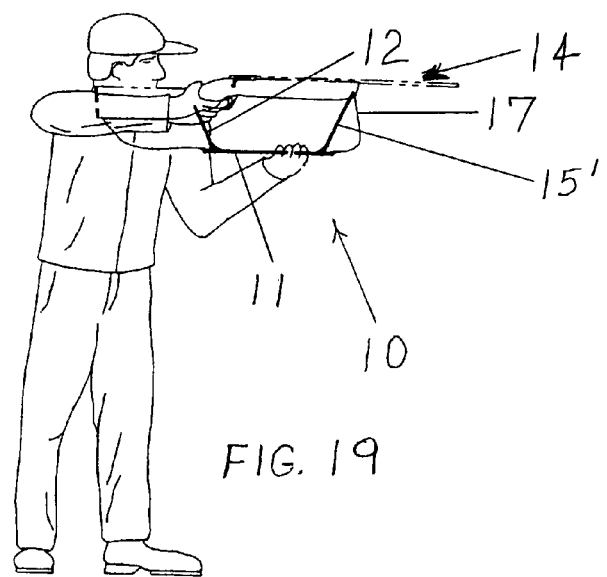

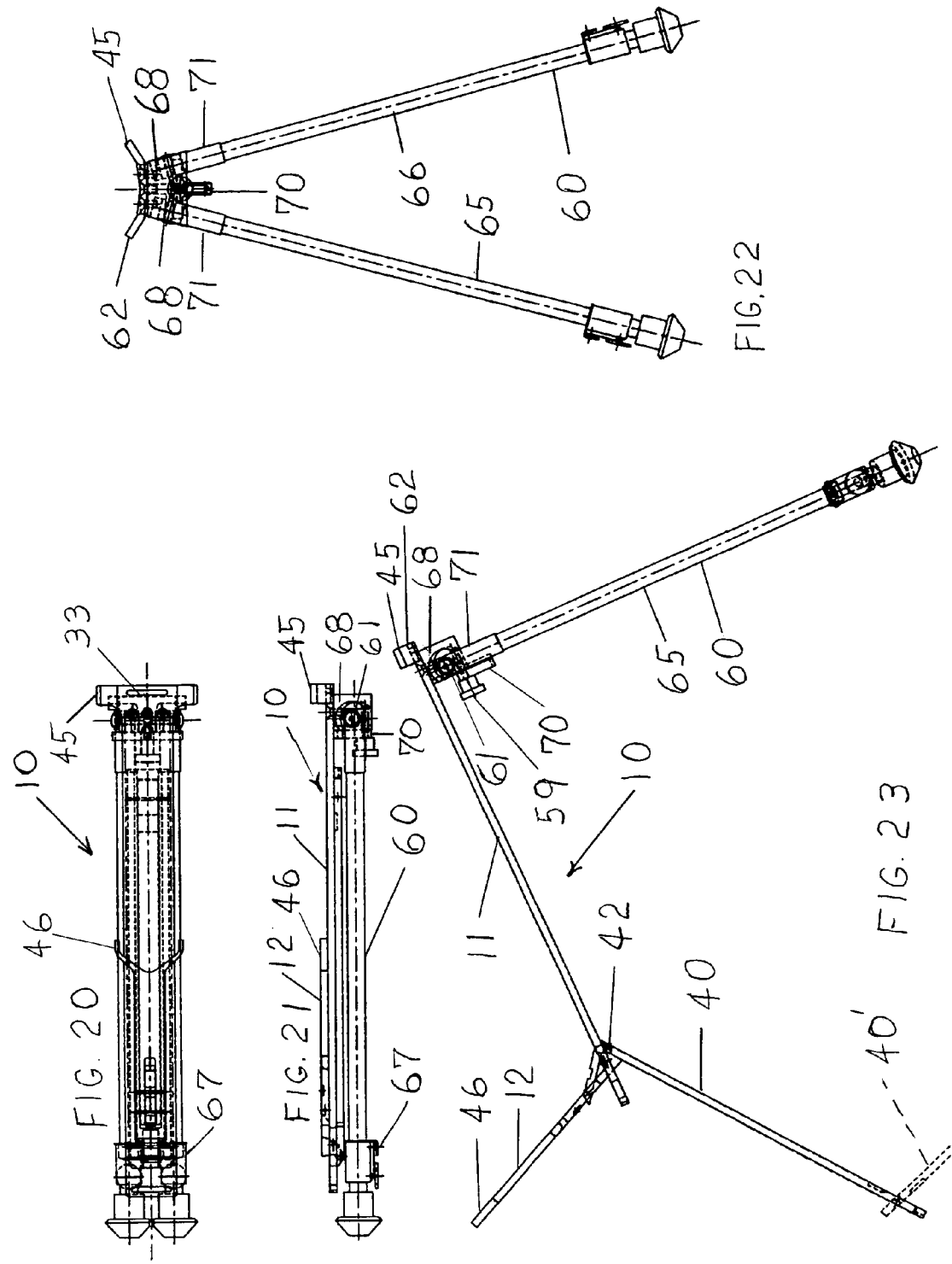

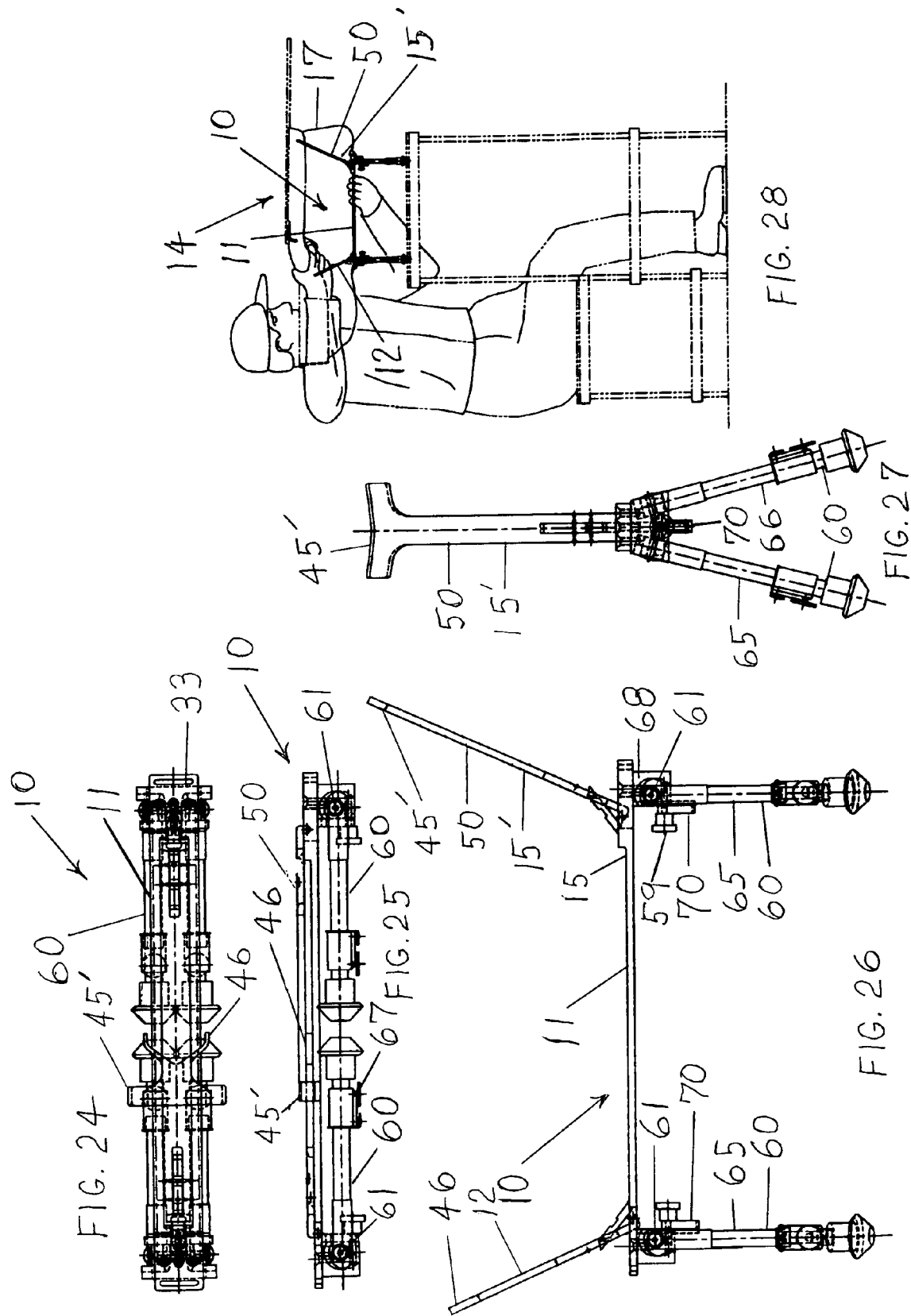

FIREARM STEADY-REST

CROSS REFERENCE TO RELATED APPLICATIONS

This application is a continuation-in-part of U.S. patent application Ser. No. 11/903,872, filed Sep. 25, 2007, now U.S. Pat. No. 8,024,883 and entitled FIREARM SUPPORT, and is further based upon U.S. Provisional Application No. 61/062,138, filed Jan. 24, 2008, and entitled FIREARM SIGHTING STEADY-REST.

BACKGROUND OF THE INVENTION

The present invention relates to firearm supports, and more particularly, to firearm supports commonly referred to as firearm steady-rest sighting supports used to steady a firearm for accurate shooting.

Rifle or firearms supports have been in existence since the advent of firearms for improving firing accuracy. Such supports, sometimes referred to as shooting sticks, are in the form of a mono-pod, a bi-pod or tripod leg configuration, and other supports are in the form of firearm cradle supports which support the rifle from a table top for sighting in a rifle.

Some supports are attached directly to the rifle, as disclosed for example in U.S. Pat. No. 5,345,706, or they can be independent support devices in which the rifle is rested. US Patent Application Publication No. 2007/0094911, discloses a rifle support which is attached to the rifle sling as opposed to being attached to the rifle.

US Patent Application Publication No. 2007/0261287 illustrates a similar firearm support system which also secures to the rifle sling. The advantage of these latter configurations is that the collapsible legs in a stored position may be oriented along the sling. However, the collapsible leg or legs have an elastic member extending through the tubular legs so that the elastic members resiliently bias the legs to automatically deploy to a fully extended position when released from its or their containment to the rifle sling. However, a problem encountered with this particular arrangement is that the deployment of the leg or legs is extremely noisy and can thereby easily scare off game within hearing distance. In addition, the bi-pod legs when deployed must be manually positioned and held.

It is an objective of the present invention to provide an improved firearm steady-rest support system which is easily carried and deployed, and which can be readily and quickly secured to any firearm or rifle without special adaptation.

SUMMARY OF THE INVENTION

The firearm steady-rest of the present invention in its most basic form includes a main support arm and a first auxiliary support arm connected to one end of the main support arm at an obtuse angle to thereby form a V-shaped support for supporting a firearm between upwardly extending distal ends thereof. Means is provided for securing the main support arm to a flexible firearm sling. The first auxiliary support arm is preferably pivotally connected to the main support arm whereby this first auxiliary support arm may be folded from its deployed position over onto or together with the main support arm in general parallel alignment with the sling. If desired, an additional mechanism may be included to permit this obtuse angle to be adjustable.

A releasable lock mechanism may be provided for releasably locking the main support arm and the first auxiliary support arm in position relative to each other when the auxiliary support arm is fully deployed. Also, cradles may be provided on the upwardly extending distal ends of the V-shaped support for engaging a firearm resting thereon. In particular, the upwardly extending distal end of the main support arm would cradle the barrel forearm of the rifle or firearm and the upward extending end of the auxiliary support arm would cradle the rifle or firearm stock in the area of the hand grip.

To provide an even shorter support when in the stored folded position, the main support arm may also fold at a fixed pivot point on to itself such that the auxiliary arm and a distal portion of the main support arm both pivot in onto the main support arm to be in general alignment with the rifle sling.

An alternative to the V-shaped support of the present invention is a U-shaped configuration wherein a second auxiliary support arm is connected to the other end of the main support arm from the end to which the first auxiliary support is connected. Both auxiliary arms at opposite ends of the main support arm are connected at an obtuse angle for thereby forming a U-shaped support for supporting a firearm between upwardly extending distal ends of the two auxiliary support arms. As is the case with the first auxiliary support arm, the second auxiliary support arm may also be folded from its fully deployed position together with the main support arm in general parallel alignment with the sling for storage.

A releasable lock mechanism is provided for releasably locking the main support arm and the first and/or second auxiliary support arms in position relative to the main support arm when the auxiliary support arms are fully deployed.

When the firearm steady-rest of the present invention is fully deployed, it may be secured temporarily to the rifle or firearm itself by the use of hook and loop fasteners or elastic fasteners to secure the steady-rest cradles to the firearm resting thereon.

Additionally, at least one support leg may be pivotally secured at an upper end thereof to an underside portion of the main support arm for pivotal deployment from a closed position in general parallel alignment with the main support arm to a deployed position at an angle relative to the main support arm to provide a leg support. The support leg may be in the form of a single support leg pivotally secured at its upper end to an underside portion of the main support arm, or it may be in the form of a multiple leg set, such as a bi-pod set of legs which are pivotally attached to the underside of the main support arm. In the bi-pod form, the two legs are in parallel with each other when in the closed storage position when engaged against the main support arm, and they are in a splayed position when fully deployed. A gravity slide lock is secured to the main support arm and engages upper portions of the single or bi-pod leg structure whereby the slide lock slides downwardly relative to the main support arm when the leg or legs are fully deployed to thereby block pivotal movement of the leg or legs back toward the storage position.

BRIEF DESCRIPTION OF THE DRAWINGS

Other objects and advantages appear hereinafter in the following description and claims. The accompanying drawings show, for the purpose of exemplification, without limiting the scope of the invention or the appended claims, certain practical embodiments of the present invention wherein:

FIG. 5 is an illustration of a hunter utilizing the steady-rest of the present invention as shown in FIGS. 1, 2 and 3 in the standing position;

FIG. 6 is an enlarged top view of a second embodiment of the locking device shown in FIG. 4 for adjustably changing the angle between the main support arm and the auxiliary support arm of the apparatus shown in FIG. 3;

FIG. 7 is an enlarged view in side elevation of the locking device shown in FIG. 6;

FIG. 8 is a top view of another embodiment of the firearm steady-rest of the present invention in a folded storage position which forms a V-shaped support configuration when unfolded similar to the type illustrated in FIG. 3;

FIG. 9 is a side view of the embodiment illustrated in FIG. 8;

FIG. 10 is a view in side elevation of the embodiment shown in FIG. 9 in an open or deployed position with all arms extended;

FIG. 11 is an enlarged view of the locking device shown in FIG. 10;

FIG. 13 is a view illustrating a hunter in a prone position utilizing the firearm steady-rest embodiment illustrated in FIGS. 8 through 10;

FIG. 14 is an illustration of a hunter shown in a sitting position and utilizing the firearm steady-rest embodiment of FIGS. 8 through 10;

FIG. 15 is an illustration of a hunter in a kneeling position utilizing the steady-rest embodiment shown in FIGS. 8 through 10;

FIG. 16 is atop view of yet another embodiment of the firearm steady-rest of the present invention in a folded storage state, which in its fully unfolded and deployed state provides a U-shaped support configuration;

FIG. 17 is a side view of the embodiment shown in FIG. 16;

FIG. 18 is a view in side elevation of the embodiment shown in FIGS. 16 and 17 in its open position with both auxiliary arms fully extended to provide the U-shaped configuration;

FIG. 19 is a view illustrating a hunter in a standing position utilizing the firearm steady-rest device or embodiment shown in FIGS. 16 through 18;

FIG. 20 is a top view of an additional embodiment of the present invention shown in a folded storage position which is basically the same embodiment illustrated in FIGS. 8, 9 and 10 with the addition of a bi-pod support;

FIG. 21 is a view in side elevation of the embodiment shown in FIG. 20;

FIG. 22 is front view of the bi-pod legs utilized in the apparatus as shown in FIGS. 20, 21 and 22 with the bi-pod legs in their fully deployed position;

FIG. 23 is a view in side elevation of the apparatus shown in FIGS. 20 and 21 in its fully deployed position;

FIG. 24 is a top view of a variation of the embodiment previously illustrated in FIGS. 16 through 18, and which incorporates a pair of bi-pod legs so that the apparatus may be utilized as a firearm bench rest;

FIG. 25 is a side view of the embodiment shown in FIG. 24;

FIG. 26 is a view in side elevation of the apparatus shown in FIG. 24 as being fully deployed and ready to use as a firearm bench rest;

FIG. 27 is a front view of the fully deployed device shown in FIG. 26; and

FIG. 28 is an illustration of a hunter or sportsman seated at a rifle range rest and utilizing the apparatus shown in FIGS. 24 through 27 for sighting in a rifle as a bench rest.

DETAILED DESCRIPTION OF THE PREFERRED EMBODIMENTS

Figure 1:
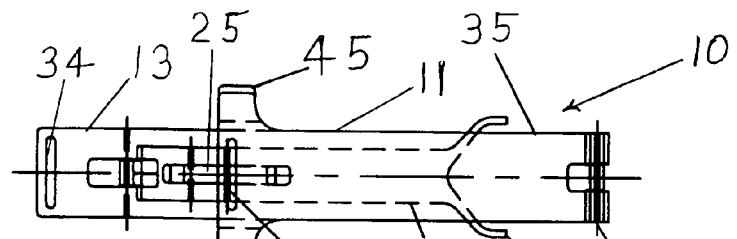
FIG. 1 is a top view of one embodiment of the firearm steady-rest of the present invention which forms a V-shaped configuration when unfolded.

With reference first to the embodiments illustrated in FIGS. 1 through 5 and 8 through 15, the firearm steady-rest 10 of the present invention, in its most basic form, consists of a main support arm 11 and a first auxiliary support arm 12 connected to one end 13 of main support arm 11 at an obtuse angle θ, thereby forming a V-shaped support as best illustrated in FIGS. 3, 5, 10, 12, 13, 14 and 15 for supporting the firearm 14 between upwardly extending distal ends 15 and 16. The main support arm 11 is secured to a flexible firearm sling 17 having a forward sling piece 18 connected between the barrel of firearm 14 and the forward distal end 15 of main support arm 11, and a rear sling portion 19 connected between the butt of firearm 14 and the rearward upwardly extending distal end 16 of auxiliary support arm 12.

Figure 2:
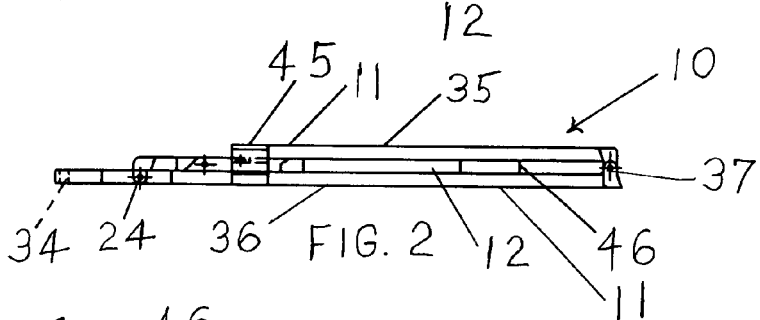
FIG. 2 is a side view of the embodiment shown in FIG. 1.
Figure 3:
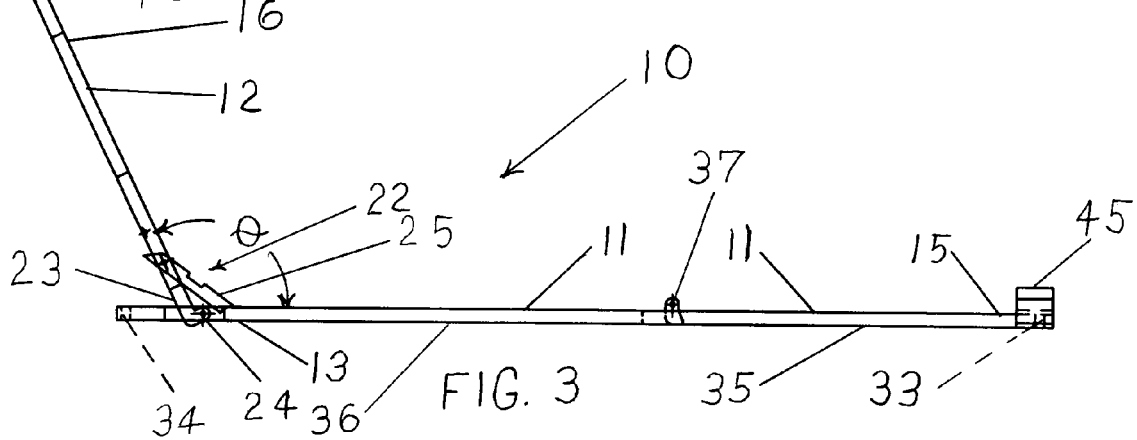
FIG. 3 is a side view of the embodiment shown in FIG. 1 in the open position with all elements thereof expanded and deployed to form the V-shape support configuration.
Figure 4:
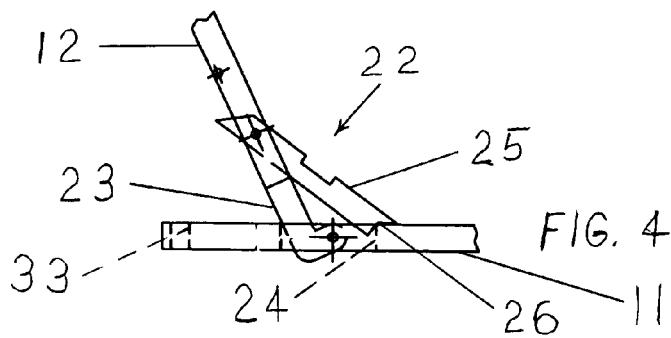
FIG. 4 is an enlarged view of the locking mechanism shown in FIG. 3 which maintains the steady-rest in an open position.

The first auxiliary support arm 12 is pivotally connected at 20 to main support arm 11 whereby first auxiliary support arm 12 may be folded from its fully deployed position as shown in FIG. 3 and FIG. 10 over onto and together with main support arm 11, as illustrated in FIGS. 1, 2, 8 and 9, together with main support arm 11 in general parallel alignment with the sling 17. First auxiliary support arm 12 when fully deployed as shown in FIGS. 3 and 10, is locked in position by a releasable lock 22 for locking the first auxiliary arm 12 in its fully deployed position at angle θ relative to main support arm 11. When first auxiliary support arm 12 is fully deployed at angle θ relative to main support arm 11, the lower backside portion 23 is pivoted at pivot point 20 and is received within a slot 24 of end 13 which acts as a stop to hold the angle θ. At this point, the locking link 25 is provided with a notched end 26 which drops down into slot 24 to lock arm 12 into position. To unlock this locking arrangement, the operator simply pulls upwardly on link 25 so that end 26 disengages from slot 24 and then the first auxiliary arm 12 may be folded to the right as seen in the figures to lie down flat together on and with main support arm 11.

The angle θ may be made adjustable. For example, see the embodiment shown in FIGS. 6 and 7. Here the end 13 of main support arm 11 is provided with first auxiliary support arm 12 pivoted thereto in the same manner as the previous embodiments, except the locking link 25 is eliminated and spring loaded protrusions 28 are provided in the sides of first auxiliary support arm 12 and expand outwardly to engage corresponding detents 30 provided in the semicircular ears 31, which ears are secured at their bases to opposite edges of main support member 11. Accordingly, first auxiliary support arm 12 may be adjusted selectively to a number of different pivotal positions to provide a desired obtuse angle θ.

The sling 17 is secured to end 15 of main support arm 11 by conventional securement through slot 33 and the rear sling portion 19 of sling 17 is secured in conventional fashion to the opposite end 13 of main support arm 11 through end slots 34.

One primary difference the embodiment of FIGS. 1 through 3 and that of FIGS. 8 through 10 is that the embodiment shown in FIGS. 1 through 3 is a shorter version of the invention when folded for storage which takes up less sling space. This is because in the embodiment shown in FIGS. 1, 2 and 3, main support arm 11 is made up of two parts, namely forward pivotal part 35 and rearward portion 36. The forward portion 35 folds at fixed pivot point 37 back on to the rearward portion 36 for storage as illustrated in FIGS. 1 and 2 wherein they are in general parallel alignment with sling 17.

Another variation between the embodiments of FIGS. 1 through 3 and that of FIGS. 8 through 10 is that the latter embodiment includes a single leg support 40 which is secured at its upper end 41 thereof to an underside portion of main support arm 11 at pivot 42 for pivotal deployment from a closed position in general parallel alignment with main support arm 11 as illustrated in FIGS. 8 and 9 to a deployed support position at an angle α relative to main support arm 11. In FIG. 10, angle α is selected so that the support leg 40 is extended rearwardly and is locked in that position whereby a shooter when in a standing or kneeling position leg 40 may engage the bottom end 43 thereof into ones body at the waist region to help steady the firearm 14. Leg 40 when fully deployed engages the bottom end of auxiliary support arm 12 as seen in FIG. 11 to lock it in position.

Figure 12:
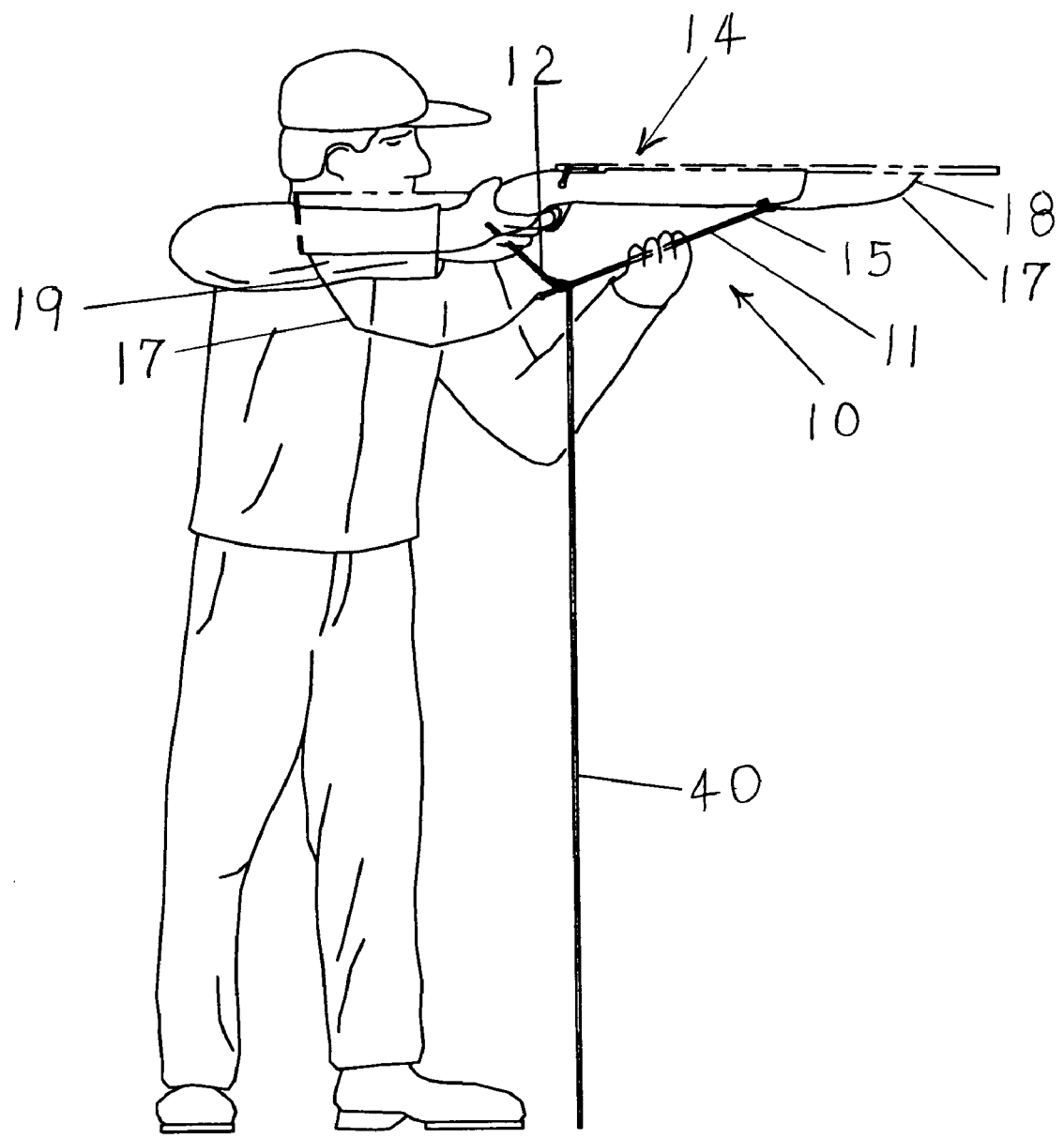
FIG. 12 is a view illustrating a hunter using the embodiment of FIGS. 8 through 10 in a standing position.

In the embodiment shown in FIGS. 12, 13, 14 and 15, the leg is permitted to pivot downwardly or to a vertical position. It should be noted that in FIG. 12, leg 40 is much longer than illustrated in the other figures. This is because the leg 40 in FIG. 12 is made up of extendable parts which are either telescopic in nature or bifold in nature. See bifold leg extension 40' in FIG. 23.

The upwardly extending distal ends 15 and 16 of the steady-rest 10 are provided with cradles 45 and 46 respectively for engaging firearm 14 resting thereon. These cradles 45 and 46 may be held in position in tight engagement with firearm 14 by using conventional hook and loop securing straps (not shown).

Turning next to the embodiment illustrated in FIGS. 16 through 20, the firearm steady-rest 10 of the present invention is in all respects similar in size, operation and purpose of the previous embodiments just explained. The primary difference is that when the firearm steady-rest 10 of the embodiment shown in FIGS. 16, 17 and 18 is fully deployed, as best illustrated in FIGS. 18 and 19, it forms a U-shaped support configuration for supporting firearm 14 between the upwardly extending distal ends 15' and 16. In this embodiment a second support auxiliary arm 50 is connected to the other end 15 of main support arm 11 at an obtuse angle and unfolds in an identical manner to that of first auxiliary support arm 12 to form the U-shaped configuration. Parts which serve the same purpose or function are numbered with the same or similar numeral designations.

Turning next to the embodiment illustrated in FIGS. 20 through 22, the firearm steady-rest 10 of the present invention illustrated is identical to that shown in FIGS. 8, 9 and 10, with the exception that a forward set of bi-pod legs is added to the structure and may be deployed as desired. In this embodiment a bi-pod set of legs 60 is pivotally secured at pivot point 61 to support rest 62, which in turn is a clamp mechanism which clamps to the forward end 15 of main support arm 11. Instead, clamp mechanism 62 could be utilized to clamp the tripod set 60 to any conventional sling. Support rest 62 also provides a firearm cradle 45.

It will be seen that when the bi-pod leg set 60 is in a closed storage position as illustrated in FIGS. 20 and 21 the legs 65 and 66 are in parallel with each other and rest against the underside of main support arm 11. The legs 60 may be held in this storage position by means of conventional hook and loop strap elements 67.

When the bi-pod leg set 60 deployed from the closed parallel and horizontal position to the fully deployed position shown in FIGS. 22 and 23, they are splayed due to the fact that they pivot along the sides of guide block 68.

A gravity slide lock 70 is secured to support rest 61 or support arm 11, and the T-shaped gravity slide lock 70 engages upper portions 71 of the legs 65 and 66 whereby the slide lock 70 slides downwardly relative to the support rest 62 or support member 11 when the legs 65 and 66 fully deployed to the vertical support position shown in FIGS. 22 and 23 to thereby block pivotal movement of the legs 65 and 66 back towards their original storage position illustrated in FIGS. 20 and 21. Knob 59 may be screwed inwardly to clamp slide lock 70 in the deployed position.

Referring next to the embodiment illustrated in FIGS. 24 through 28, the firearm steady-rest 10 of the present invention is identical to the embodiment illustrated in FIGS. 16, 17 and 18, with the addition of two tripod leg sets 60 secured to opposite ends 15 and 13 of main support arm 11. The bi-pod sets 60 are connected in the same manner as the bi-pod set in the previous embodiment and they are identical in all respects. In a similar manner, the bi-pod leg sets 60 here also fold toward each other for storage in the closed position against main support arm 11 as illustrated in FIGS. 24 and 25. When the leg sets 60 are in their fully deployed position as shown in FIGS. 26, 27 and 28, the steady-rest 10 of the present invention can be easily utilized as a rifle sighting gun rest as illustrated in FIG. 29.

The firearm steady-rest 10 may be constructed of any desirable or suitable material, such as steel, aluminum or plastic, and it may be maintained in its closed position by a loop and hook strap arrangement as previously indicated or by any suitable magnetic mechanism. The steady-rest 10 may be covered with a rubber or plastic coating or a fabric cover to protect the firearm.

In addition, the height of all legs 40 or bi-pod sets 60 may be extendable either by conventional telescopic means or foldout means. The bi-pod sets 60 may also pivot in the horizontal plane where they connect to support rest 62.

The sighting height of the barrel of firearm 14 may be adjusted by changing the position of firearm 14 forward or rearward in cradles 45 and 46. Also, aiming may be adjusted by adjusting any of the legs 40 or 60.

I claim:

1. A firearm steady-rest comprising:
    a main support arm and a first auxiliary support arm connected to one end of said main support arm at an obtuse angle to thereby form a V-shaped support for supporting a firearm between upwardly extending cradles on respective distal ends thereof; and
    said main support arm having opposite ends thereof secured respectively to forward and rearward flexible rifle sling portions;
    wherein said first auxiliary support arm is pivotally connected to said main support arm whereby said first auxiliary support arm may be folded from its fully deployed position together with said main support arm in general parallel alignment with said sling.

2. The firearm steady-rest of claim 1, including means for adjusting said obtuse angle.

3. The firearm steady-rest of claim 1, wherein said main support arm folds at a fixed pivot point on to itself for storage.

4. The firearm steady-rest of claim 1, including a second auxiliary support arm connected to the other end of said main support arm at an obtuse angle for thereby forming a U-shaped support for supporting a firearm between upwardly extending distal ends of said auxiliary support arms; and wherein said second auxiliary support arm is also pivotally connected to said main support arm whereby said second auxiliary support arm may also be folded from its fully deployed position together with said main support arm in general parallel alignment with said sling.

5. The firearm steady-rest of claim 4, including means for adjusting said obtuse angles.

6. The firearm steady-rest of claim 1, including releasable lock means for releasably locking said main support arm and said first auxiliary support arm in position relative to each other when said auxiliary support arm is fully deployed.

7. The firearm steady-rest of claim 4, including releasable lock means for releasably locking said main support arm and said first and second auxiliary support arms in position relative to said main support arm when said auxiliary support arms are fully deployed.

8. The firearm steady-rest of claim 1, including cradles on said distal ends for engaging a firearm resting thereon.

9. The firearm steady-rest of claim 8, said cradles including securing straps for securing said cradles to a firearm resting thereon.

10. The firearm steady-rest of claim 2, including cradles on said distal ends of said auxiliary arms for engaging a firearm resting thereon.

11. The firearm steady-rest of claim 10, said cradles including securing straps for securing said cradles to a firearm resting thereon.

12. The firearm steady-rest of claim 1, including at least one support leg pivotally secured at an upper end thereof to an underside portion of said main support arm for pivotal deployment from a closed position in general parallel alignment with said main support arm to a deployed support position at an angle relative to said main support arm.

13. The firearm steady-rest of claim 4, including cradles on said distal ends of said auxiliary arms for engaging a firearm resting thereon.

\* \* \* \* \*